(12) United States Patent
Kayahara

(10) Patent No.: US 7,035,861 B2
(45) Date of Patent: Apr. 25, 2006

(54) SYSTEM AND METHODS FOR PROVIDING DATA MANAGEMENT AND DOCUMENT DATA RETRIEVAL

(75) Inventor: Naoki Kayahara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 470 days.

(21) Appl. No.: 10/373,810

(22) Filed: Feb. 27, 2003

(65) Prior Publication Data

US 2003/0187845 A1 Oct. 2, 2003

(30) Foreign Application Priority Data

Mar. 4, 2002 (JP) .............................. 2002-058065

(51) Int. Cl.
*G06F 17/30* (2006.01)

(52) U.S. Cl. ........................................ 707/100; 707/2

(58) Field of Classification Search ................ 707/3–7, 707/2, 100; 715/500; 382/190
See application file for complete search history.

(56) References Cited

U.S. PATENT DOCUMENTS 6,665,667 B1 * 12/2003 Inaba et al. ..................... 707/5
6,895,552 B1 * 5/2005 Balabanovic et al. ....... 715/513
6,912,536 B1 * 6/2005 Ochitani ..................... 707/100

FOREIGN PATENT DOCUMENTS

JP          A 7-325832          12/1995

* cited by examiner

*Primary Examiner*—Greta Robinson
*Assistant Examiner*—Cheryl Lewis
(74) *Attorney, Agent, or Firm*—Oliff & Berridge, PLC

(57) ABSTRACT

The invention provides a data management device which is well suited to grasp featuring parts from among a huge amount of data, which are capable of enhancing the reliability of extraction and which can immediately comply with a user's request. In particular, feature data for calculating the temporal transition of similarities concerning the contents of document data can be extracted from the document data of a document data registration database, the change point of the similarities can be specified on the basis of the extracted feature data, and document data are retrieved from within the document data registration database on the basis of the specified change point. In the retrieval, the document data which belong to the specified change point or the vicinity thereof can be retrieved.

10 Claims, 10 Drawing Sheets

| | |
|---|---|
| JANUARY ⇔ FEBRUARY | 0.124477 |
| FEBRUARY ⇔ MARCH | 0.148288 |
| MARCH ⇔ APRIL | 0.096936 |
| APRIL ⇔ MAY | 0.176061 |
| MAY ⇔ JUNE | 0.176194 |
| JUNE ⇔ JULY | 0.124569 |
| JULY ⇔ AUGUST | 0.088018 |
| AUGUST ⇔ SEPTEMBER | 0.146267 |
| SEPTEMBER ⇔ OCTOBER | 0.141868 |
| OCTOBER ⇔ NOVEMBER | 0.164984 |
| NOVEMBER ⇔ DECEMBER | 0.163609 |

SYSTEM AND METHODS FOR PROVIDING DATA MANAGEMENT AND DOCUMENT DATA RETRIEVAL

BACKGROUND OF THE INVENTION

1. Field of Invention

The present invention relates to a device, a program and a method which retrieve desired document data from among a plurality of document data having different creation dates or update dates. More particularly, the invention relates to a data management device, a document data retrieval device, a data management program, a document data retrieval program, a data management method, and a document data retrieval method which are well suited to grasp featuring parts from among a huge amount of data, which are easy of enhancing the reliability of extraction, and which can immediately comply with a user's request.

2. Description of Related Art

In an enterprise or the like, the progress situation of business is sometimes controlled by causing employees to submit daily business-records. Reports based on the daily business-records are often checked in such a way that one supervisor looks through the daily business-records submitted by a plurality of subordinates, one by one.

The supervisor, however, cannot look through all the submitted business-records every day without fail for reasons of their other duties. Besides, granted that all the daily business-records are looked through, the amount of graspable information is inevitably limited within a restricted time. Accordingly, in a case where the quantity of the daily business-records to be checked becomes huge, it is very difficult to efficiently control the progress situation of the business.

In such a case, in order to efficiently control the progress situation of the business, the supervisor needs to efficiently obtain information from the voluminous daily business-records. Therefore, the property of the daily business-record will be first studied. The daily business-record can chiefly contain the daily business report of each employee, so that many parts ought to repeat in contents when daily business-record records of near creation dates are compared as to the daily business-record submitted by the identical employee. It can be inefficient to look through the parts repeating in contents every day. Accordingly, the supervisor can obtain information comparatively efficiently by grasping the repeating contents only once and grasping only featuring parts (that is, parts having changed) in the subsequent daily business-records.

As one solution to this problem, it is possible to propose, for example, the structure which can accumulate the daily business-records in document database (hereinbelow, the database shall be simply abbreviated to "DB") as document data, and which can retrieve only the featuring parts from within the document DB.

Heretofore, as a technique for retrieving desired document data from among a plurality of document data, there has been, for example, a retrieval method utilizing the temporal change of a word specification pattern as disclosed in Japanese Laid-open Patent Publication JP-A-7-325832. Besides, as related techniques, there have been, for example, an inference device disclosed in Japanese Laid-open Patent Publication JP-A-6-324871, and an example-based retrieval system creation support device disclosed in Japanese Laid-open Patent Publication JP-A-5-53814.

In the first example, a feature data extraction unit extracts feature data, which express the temporal changes of the word using patterns, from text information beforehand. When a user gives a retrieval input, an input processing unit translates the user's retrieval input into a representation form which can be interpreted by a retrieval processing unit, and it sends the translated input to the retrieval processing unit. The retrieval processing unit performs retrieval by utilizing the text information and the feature data, and the result of the retrieval is sent to an output processing unit and is displayed to the user. Various statistics, for example, the probability of occurrences of each word in the text information can be employed as the feature data.

Thus, the utilization of the feature data extracted from the time series text information permits the retrieval for a word, information or the like having become a topic in a specified field or term, and high quality a trend analysis can be easily made.

In the second example, a logical vector transformation unit transforms rules stored in a rule storage unit, examples stored in an example storage unit, and inference conditions inputted from an inference condition input unit, into a rule vector, an example vector, and a condition vector which are logical vectors, respectively. An indefinite element addition unit adds indefinite elements to the rule vector and the example vector, thereby to turn them into an indefinite rule vector and an indefinite example vector, respectively. Besides, a result vector calculation unit calculates and turns the logical product of the indefinite rule vector, the indefinite example vector, and the condition vector into a result vector. A logical proposition transformation unit transforms the result vector into an indefinite logical proposition. An indefinite element removal unit removes the indefinite elements from the indefinite logical proposition, thereby to produce a definite logical proposition. A logical proposition output unit outputs the definite logical proposition.

Thus, an inference of excellent inference efficiency and low burden for knowledge acquisition can be made.

The third example can retrieve similarities by dividing an example into a plurality of parts. A vector division unit and a sub-vector similarity computation unit are associated. Addition operations attendant upon subvectorized representations are possible. Besides, an alteration monitor function and an alteration comparison function are realized so as to be used when the performance of a system is gradually enhanced.

Thus, the indispensable functions of a creation environment required for erecting the example-based inference system can be offered.

SUMMARY OF THE INVENTION

In this manner, in the first example, the retrieval is performed on the basis of the feature data which indicate the temporal change of the word using pattern, so that document data in which, for example, the frequency of use of a retrieval word inputted by the user is high can be extracted. However, in the case of extracting the featuring parts from within the group of document data in which the repeating contents are comparatively large in number, the featuring parts can be really extracted if the specified word is frequently used therein. But the specified word is not always used frequently. Accordingly, this example is not suited to extract the featuring parts, and it is difficult of efficiently obtaining the desired information from among the huge amount of information as exemplified by the daily business-records.

Besides, in a case where the second example is applied to the retrieval of the document data, the retrieval is performed on the basis of rules established by an expert. In this regard, although a large number of rules established by the expert need to be accumulated for enhancing the reliability of extraction, the rule accumulation of a knowledge DB is not easy ordinarily. Further, since a long time is expended on the rule accumulation, this example is difficult of immediately complying with a user's request.

Besides, whereas the features of examples are averaged with example attribute vectors only, so a potential relevant example might be overlooked, the potential relevant example can be found out in the third example in such a way that partial features are compared by utilizing sub-vectors. However, this example is a technique which pursues a high-precision retrieval for an example to the last, and it is unsuited to extract the featuring parts from within the group of document data in which the repeating contents are comparatively large in number. Similarly to the foregoing, it is difficult of efficiently obtaining the desired information from among the huge amount of information as exemplified by the daily business-records.

These facts are problems which are not limited to the retrieval of the document data as exemplified by the daily business-records, but which are supposed in all cases where information is to be efficiently obtained from among a huge amount of information. They may possibly occur also when image data, music data, or other data are managed by way of example.

Therefore, the present invention has been made with note taken of such unsolved problems involved in the techniques, and it has for its object to provide a data management device, a document data retrieval device, a data management program, a document data retrieval program, a data management method, and a document data retrieval method which are well suited to grasp featuring parts from among a huge amount of data, which are easy of enhancing the reliability of extraction and which can immediately comply with a user's request.

In order to accomplish the object, a data management device of the invention consists in a device for managing a plurality of data that can include feature data extraction device for extracting feature data, for calculating similarities concerning contents of the data, from among the plurality of data, and change point specified device for specifying a change point of the similarities on the basis of the feature data extracted by said feature data extraction device.

With such structure, the feature data for calculating the similarities concerning the contents of the data is extracted from the plurality of data by the feature data extraction device, and the change point of the similarities is specified on the basis of the extracted feature data by the change point specified device. Accordingly, a user can comparatively easily grasp featuring parts from among a huge amount of data by referring to the specified change point.

Further, a data management device of the invention can be included consists in the data management device of the above device the data are document data.

With such structure, the feature data for calculating the similarities concerning the contents of the document data is extracted from the plurality of document data by the feature data extraction device, and the change point of the similarities is specified on the basis of the extracted feature data by the change point specified device. Accordingly, a user can comparatively easily grasp featuring parts from among a huge amount of document data by referring to the specified change point.

Meanwhile, in order to accomplish the object, a document data retrieval device can be included in a device for performing retrieval from among a plurality of document data of different creation dates or update dates. The device include a document data storage device for storing the plurality of document data, feature data extraction device for extracting feature data, which indicates a temporal transition of similarities concerning contents of the document data, from among the document data of said document data storage device, change point specified device for specifying a change point of the similarities on the basis of the feature data extracted by said feature data extraction device, and document data retrieval device for retrieving the document data from within said document data storage device on the basis of the change point specified by said change point specified device.

With such structure, the feature data which indicates the temporal transition of the similarities concerning the contents of the document data is extracted from the document data of the document data storage device by the feature data extraction device, and the change point of the similarities is specified on the basis of the extracted feature data by the change point specified device. Besides, the document data are retrieved from within the document data storage device on the basis of the specified change point by the document data retrieval device.

Here, the document data storage device stores therein the document data by any means and in any term, and it may either store the document data beforehand or store the document data by external inputs or the likes on the occasion of the operation of this device, without storing the document data beforehand. The same shall apply to a document data retrieval program of the invention described below.

Further, a document data retrieval device of the invention can be included in the above document data retrieval device described above, and further include a document data retrieval device retrieves the document data which belong to the change point specified by said change point specified device or vicinity thereof, from within said document data storage device. With such structure, the document data belonging to the specified change point or the vicinity thereof are retrieved from within the document data storage device by the document data retrieval device.

Further, in the document data retrieval device of the invention can be included consists in the document data retrieval device described above, and further include a change point specified device that sets an allowable range on the basis of the feature data extracted by said feature data extraction device and specifies a point which exceeds the allowable range in the temporal transition of the similarities, as the change point. With such structure, owing to the change point specified device, the allowable range is set on the basis of the extracted feature data, and the point exceeding the allowable range in the temporal transition of the similarities is specified as the change point.

Further, in the document data retrieval device in a document data retrieval device described above, the feature data extraction device can partition the document data of said document data storage device at intervals of a predetermined term, generate term document data for each partition in which contents of the document data belonging to the corresponding partition are merged, calculate the similarity as to the term document data which are adjacent in time series, and generate the feature data on the basis of the calculated similarity.

With such structure, owing to the feature data extraction device, the document data of the document data storage device can be partitioned at the intervals of the predetermined term, and the term document data is generated in every partition. The term document data is generated as one in which the contents of the document data belonging to the corresponding partition are merged. Besides, the similarity is calculated as to the term document data which are adjacent in time series, and the feature data is generated on the basis of the calculated similarity.

Further, in the document data retrieval device in a document data retrieval device described above, the feature data extraction device can partition the document data of said document data storage device at intervals of a predetermined term, generate term document data for each partition in which contents of the document data belonging to the corresponding partition are merged, calculate the similarities among the generated term document data one another, and generate the feature data on the basis of the calculated similarities.

With such structure, owing to the feature data extraction device, the document data of the document data storage device can be partitioned at the intervals of the predetermined term, and the term document data is generated in every partition. The term document data is generated as one in which the contents of the document data belonging to the corresponding partition are merged. Besides, the similarities are calculated among the generated term document data one another, and the feature data are generated on the basis of the calculated similarities.

Further, in the document data retrieval device in a document data retrieval device described above, the feature data extraction device calculates document vector which indicates a feature of contents of the term document data, and compares the calculated document vectors, thereby to calculate the similarities. With such structure, owing to the feature data extraction device, the document vector indicating the feature of the contents of the term document data are calculated, and the calculated document vectors are compared, thereby to calculate the similarities.

Further, in the document data retrieval device in a document data retrieval device described above, the feature data extraction device can conduct a morpheme analysis of the term document data, and generate a vector, as the document vector, which has an element, as a vector quantity, corresponding to frequencies of occurrences of respective morphemes in the term document data. With such structure, owing to the feature data extraction device, the term document data are done with a morpheme analysis, and a vector which has an element, as a vector quantity, corresponding to frequencies of occurrences of respective morphemes in the term document data is generated as the document vector. In a case where the morpheme which is not common between the term document data to-be-compared occurs in any certain document data, it is highly possible that a featuring part be contained in the certain document data. It is accordingly effective for the retrieval of featuring parts from among a huge amount of document data to calculate the similarities in correspondence with the frequencies of occurrences of the morphemes in the term document data in this manner.

Further, in the document data retrieval device in a document data retrieval device described above, the feature data extraction device removes contents common to the respective term document data from these respective term document data, and calculates the similarities on the basis of the term document data subjected to the removal. With such structure, owing to the feature data extraction device, the contents common to the respective term document data are removed from these respective term document data, and the similarities are calculated on the basis of the term document data subjected to the removal.

Meanwhile, in order to accomplish the object, a data management program of a program for managing a plurality of data can include a program for causing a computer to execute a process which is implemented as feature data extraction device for extracting feature data, for calculating similarities concerning contents of the data, from among the plurality of data, and change point specified device for specifying a change point of the similarities on the basis of the feature data extracted by said feature data extraction device.

With such structure, when the program is read by the computer, which then executes the process in accordance with the read program, an operation equivalent to the data management device of described above is attained.

Further, in the data management program in a data management program described above, the data can be document data. With such structure, when the program is read by the computer, which then executes the process in accordance with the read program, an operation equivalent to the data management device above described invention can be attained.

Meanwhile, in order to accomplish the object, a document data retrieval program can include a program for performing retrieval from among a plurality of document data of different creation dates or update dates, including a program for causing a computer to execute a process, which can utilize document data storage device for storing the plurality of document data therein, which is implemented as feature data extraction device for extracting feature data, for calculating a temporal transition of similarities concerning contents of the document data, from among the document data of the document data storage device, change point specified device for specifying a change point of the similarities on the basis of the feature data extracted by said feature data extraction device, and document data retrieval device for retrieving the document data from within the document data storage device on the basis of the change point specified by said change point specified device.

With such structure, when the program is read by the computer, which then executes the process in accordance with the read program, an operation equivalent to the above-described data management device can be attained.

Meanwhile, in order to accomplish the object, a data management method of the invention can include a method for managing a plurality of data, including the feature data extraction step of extracting feature data, for calculating similarities concerning contents of the data, from among the plurality of data, and the change point specified step of specifying a change point of the similarities on the basis of the feature data extracted by said feature data extraction step.

Further, in the data management method of the invention in a data management method the data can be document data.

Meanwhile, in order to accomplish the object, a document data retrieval method of the invention can include a method for performing retrieval from among a plurality of document data of different creation dates or update dates, including the document data storage step storing the plurality of document data in document data storage device, the feature data extraction step of extracting feature data, for calculating a temporal transition of similarities concerning contents of the document data, from among the document data of the document data storage device, the change point specified step of specifying a change point of the similarities on the basis of the feature data extracted by said feature data extraction step, and the document data retrieval step of retrieving the document data from within the document data storage device on the basis of the change point specified by said change point specified step.

BRIEF DESCRIPTION OF THE DRAWINGS

The invention will be described with reference to the accompanying drawings, wherein like elements reference like elements, and wherein.

DETAILED DESCRIPTION OF PREFERRED EMBODIMENTS

Embodiments of the present invention will be described with reference to the drawings. FIG. 1 through FIG. 9 are diagrams showing an embodiment of a data management device, a document data retrieval device, a data management program, a document data retrieval program, a data management method, and a document data retrieval method according to the present invention.

Figure 1:
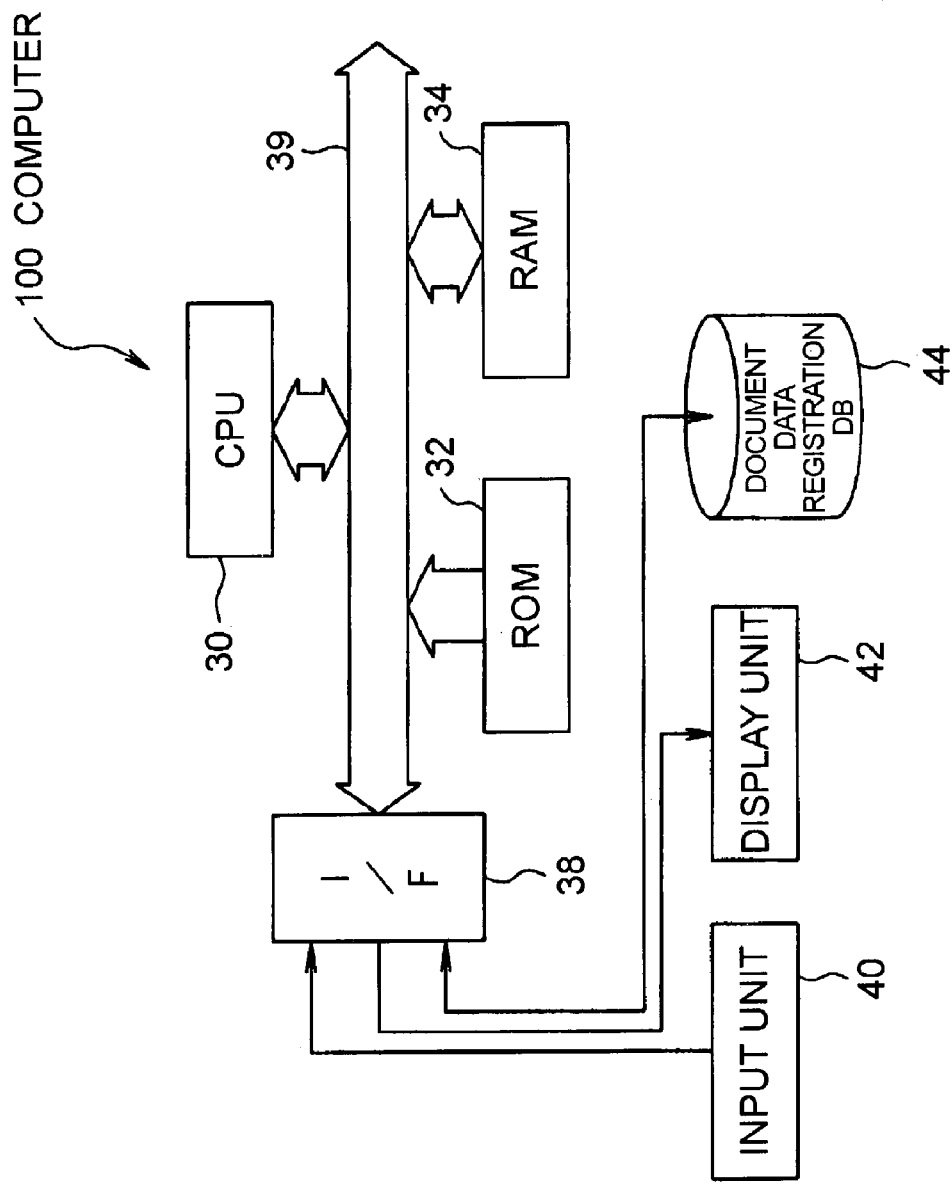
FIG. 1 is an exemplary block diagram showing the structure of a computer for applying the present invention.

This embodiment is such that the data management device, document data retrieval device, data management program, document data retrieval program, data management method, and document data retrieval method according to the present invention are applied to a case of retrieving featuring document data from among a plurality of document data, by a computer 100 as shown in FIG. 1.

First, the structure of the computer 100 for applying the present invention will be described with reference to FIG. 1. FIG. 1 is an exemplary block diagram showing the structure of the computer 100 for applying the present invention.

As shown in FIG. 1, the computer 100 is constructed of a CPU 30 which controls operations and the whole system on the basis of a control program, a ROM 32 which stores the control program of the CPU 30, etc. in predetermined areas beforehand, a RAM 34 which serves to store data read out from the ROM 32, etc. and operated results necessary in the operating process of the CPU 30, and an I/F 38 through which data are inputted from and outputted to external devices, these constituents being connected to one another so as to be capable of exchanging data, by a bus 39 including signal lines for transferring data.

Connected as the external devices to the I/F 38 are an input unit 40 which can include a keyboard, a mouse, etc. capable of inputting data as human interfaces, a display unit 42 which displays a screen on the basis of an image signal, and a document data registration DB 44 in which document data are stored.

The document data registration DB 44 stores, for example, document data on a daily business-record by each employee. Accordingly, a plurality of document data of different creation dates or update dates are stored in the document data registration DB 44.

Figure 2:
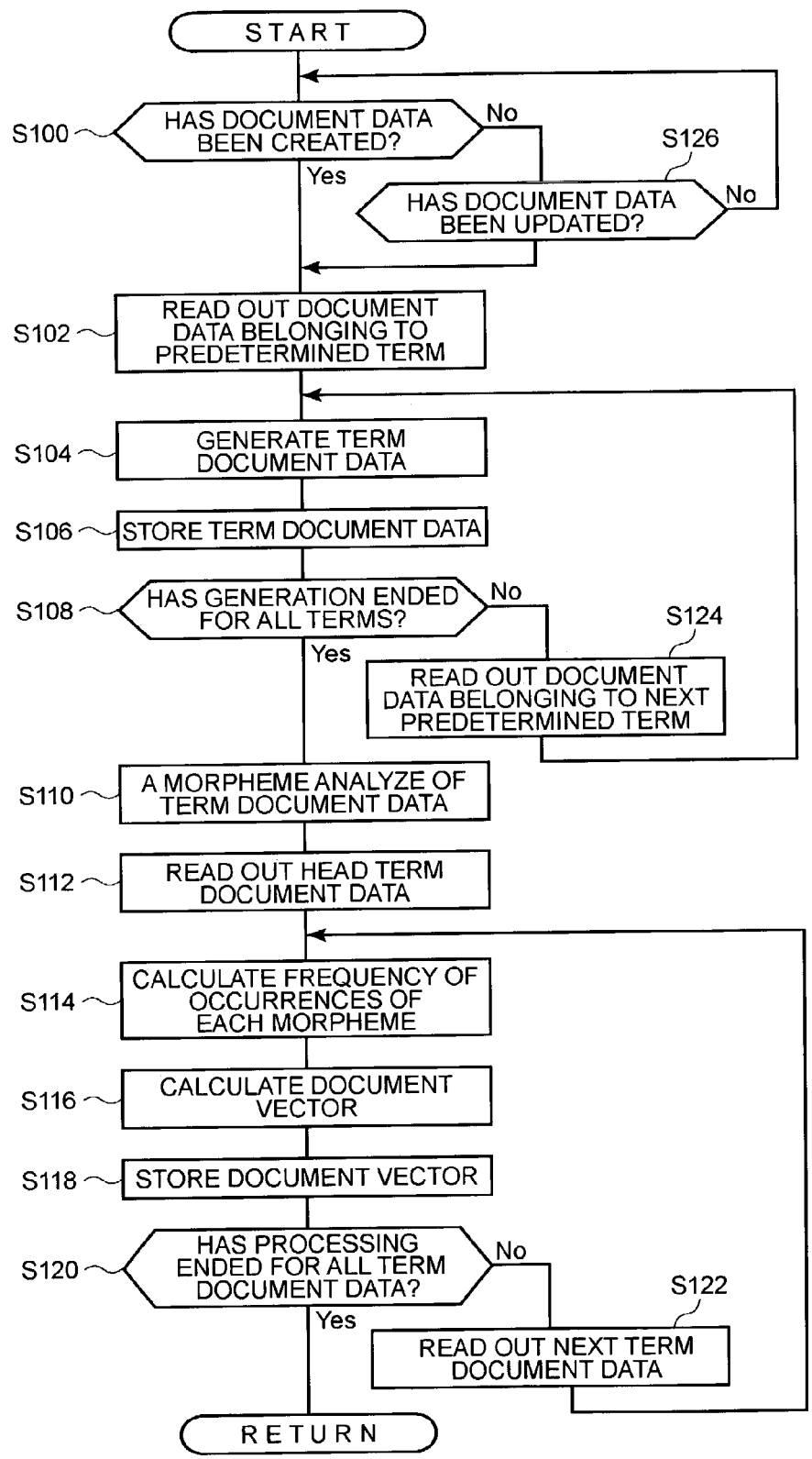
FIG. 2 is a flow chart showing an exemplary document vector calculation process.
Figure 6:
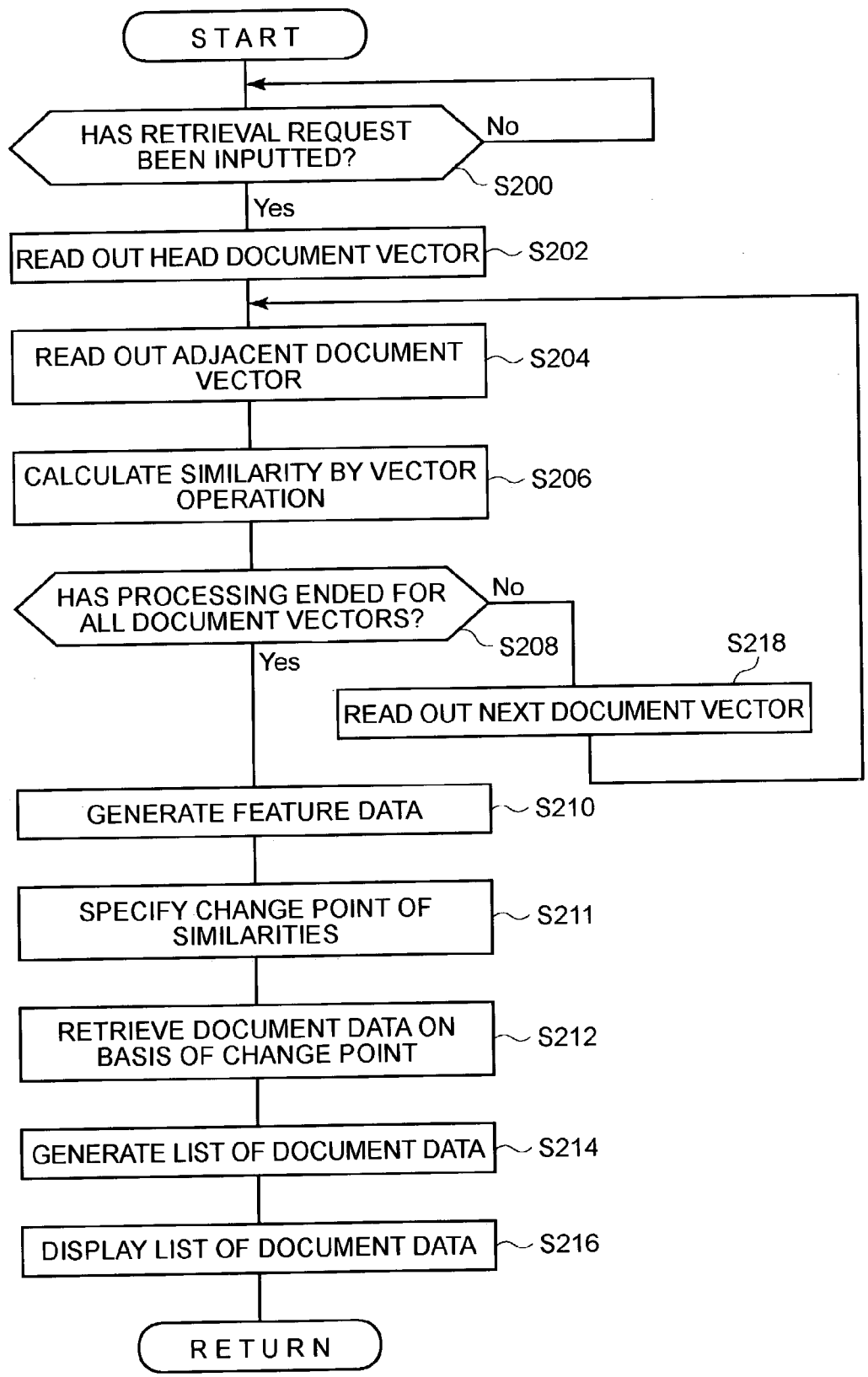
FIG. 6 is a flow chart showing a document data retrieval process.

The CPU 30 is made of a micro processing unit, MPU or the like, and it starts predetermined programs stored in the predetermined areas of the ROM 32, whereby a document vector calculation process and a document data retrieval process shown in the flow charts of FIG. 2 and FIG. 6 are respectively executed in time division in accordance with the programs.

Initially, the document vector calculation process will be described in detail with reference to FIG. 2. FIG. 2 is the flow chart showing the document vector calculation process.

The document vector calculation process is a process for calculating a document vector necessary for the retrieval of the document data, and when executed by the CPU 30, it first shifts to a step S100 as shown in FIG. 2.

At the step S100, whether or not new document data has been created in the document data registration DB 44 is decided. Subject to the decision (Yes) that the new document data has been created, the routine shifts to a step S102.

Figure 3A:
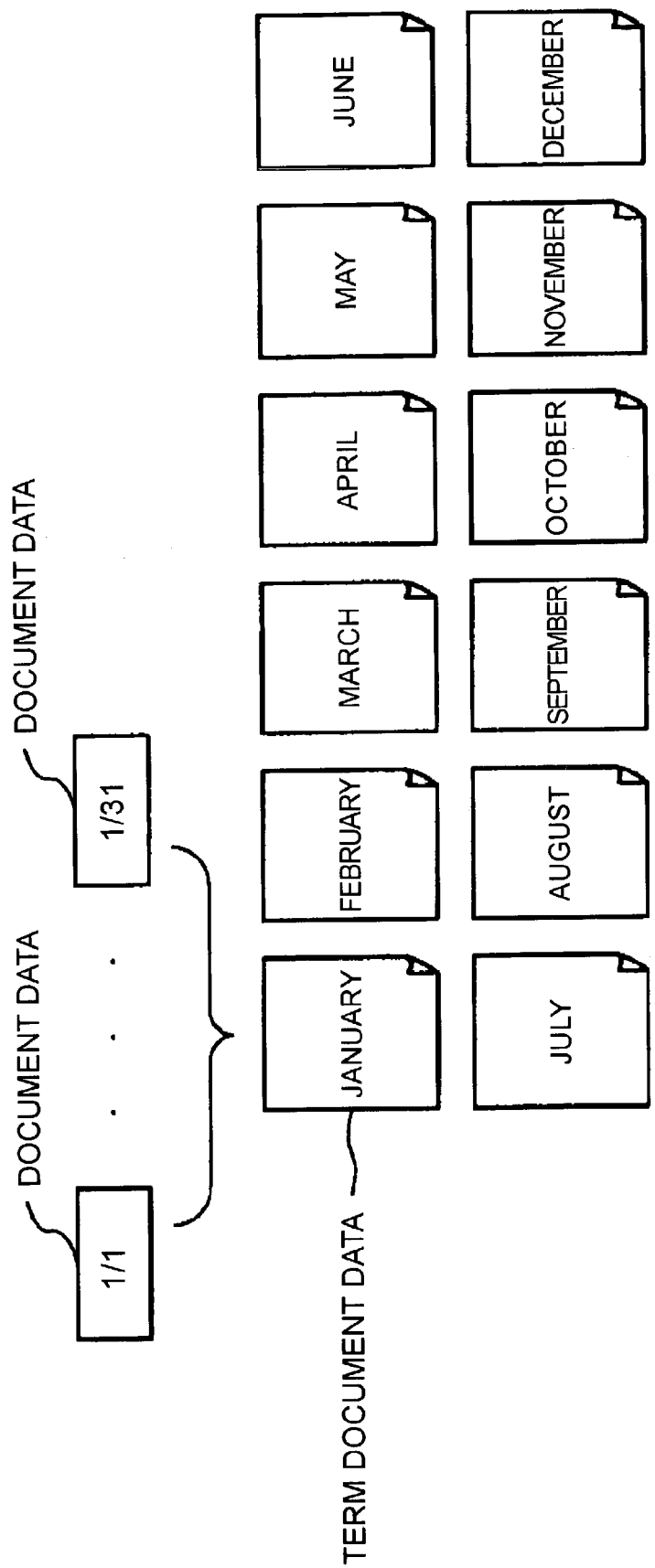
FIGS. 3A–3B is a diagram showing a case of generating term document data.
Figure 3B:
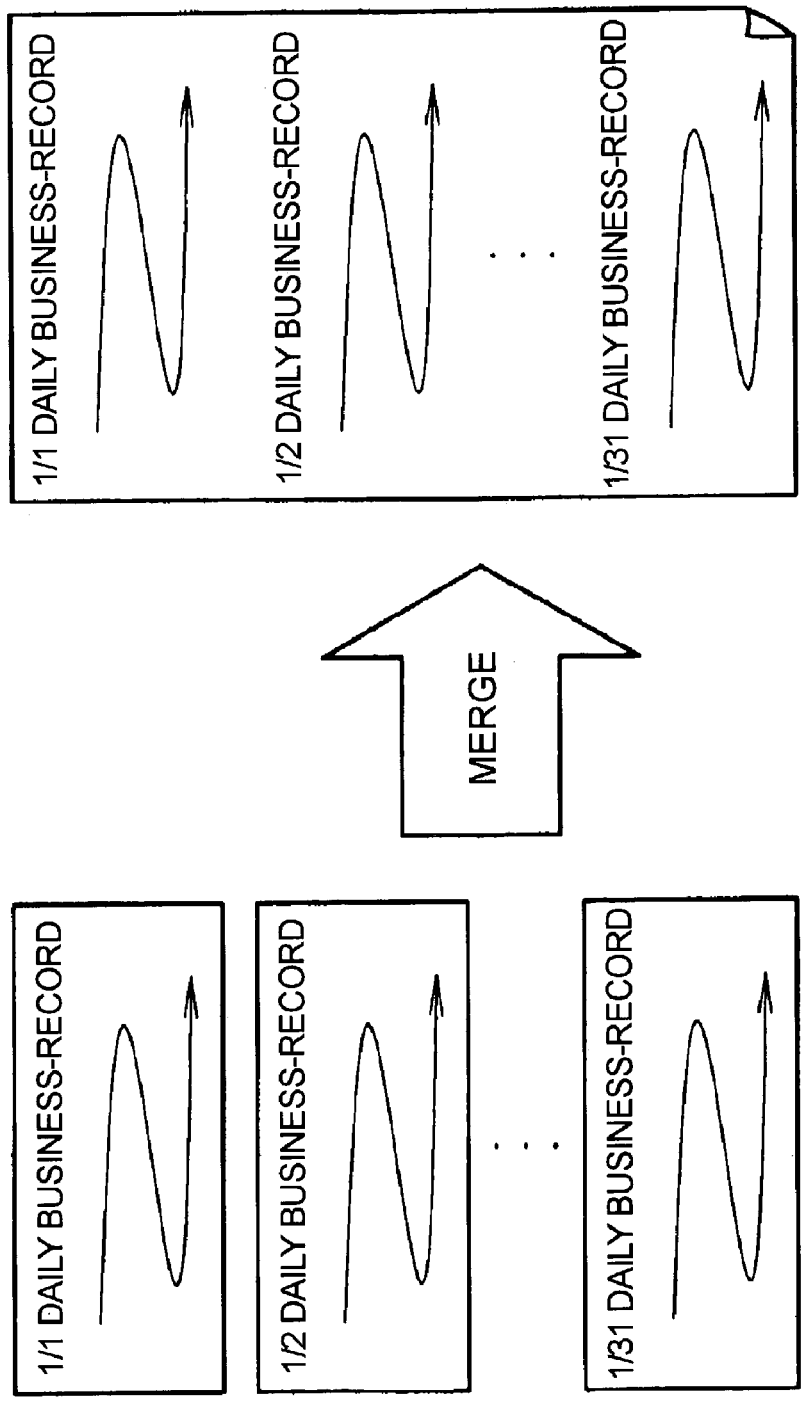
Figure 4:
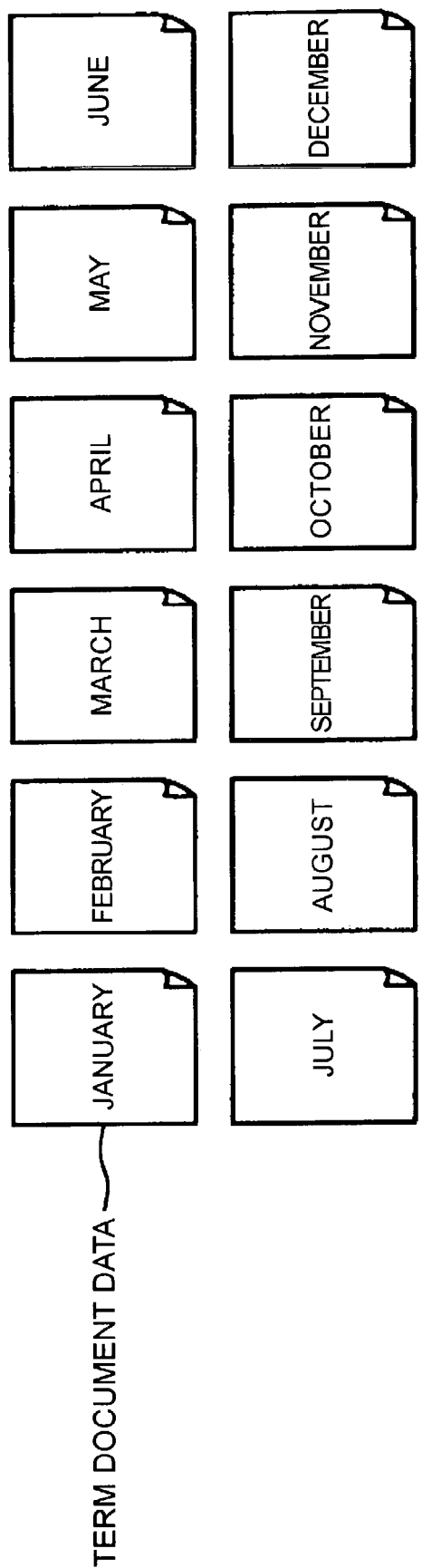
FIG. 4 is a diagram showing a case of generating term document data.

At the step S102, document data which belong to a predetermined term (for example, one month) since a reference date are read out from the document data registration DB 44, whereupon the routine shifts to a step S104 for generating term document data in which the contents of the document data read out are merged. In a case, for example, where the employee creates document data in each individual day unit and where a supervisor checks the document data in each individual month unit, the step S104 generates the term document data for January by rearranging assumed document data created in January, in the sequence of creation dates and simply combining the rearranged document data, as shown in FIGS. 3(*a*) and (*b*). Besides, in a case, for example, where the employee creates document data in each individual month unit and where the supervisor checks the document data similarly in each individual month unit, the generation of the term document data proceeds as shown in FIG. 4. More specifically, when only one document data has been created in January, it is directly delivered as the term document data for January, and when a plurality of document data have been created in January, they are combined, thereby to generate the term document data for January. FIG. 3 and FIG. 4 are diagrams showing the cases where the term document data are generated.

Subsequently, the routine shifts to a step S106, at which the generated term document data is stored in the document data registration DB 44, whereupon the routine shifts to a step S108, at which whether or not the generation of the term document data has ended for all the document data of the document data registration DB 44 is decided. Subject to the decision (Yes) that the generation of the term document data has ended, the routine shifts to a step S110.

Figure 5:
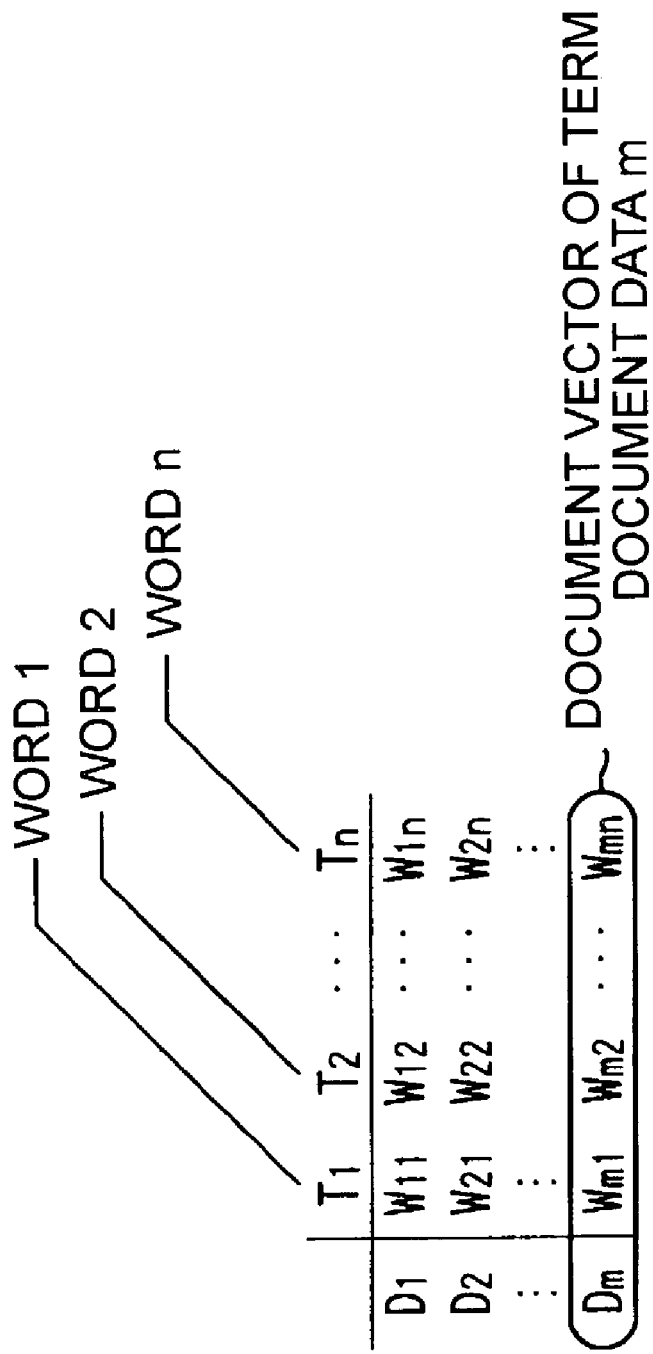
FIG. 5 is a diagram showing the composition of a document vector.

At the step S110, all the term document data are done with a morpheme analysis, and all kinds of morphemes which occur in any of the term document data are acquired. Thereafter, the routine shifts to a step S112 at which the head term document data is read out from the document data registration DB 44, it shifts to a step S114 at which the frequency of occurrences of each of the morphemes acquired at the step S110 is calculated in the term document data read out, and it shifts to a step S116 at which a vector that has elements corresponding to the calculated frequencies of occurrences, as vector quantities, is calculated as a document vector. Here, a method of calculating the document vector will be described with reference to FIG. 5. FIG. 5 is a diagram showing the composition of the document vector.

First, as shown in FIG. 5, the document vector can be represented as an n-dimensional vector by an equation (1) given below. In general, n denotes the number of non-repeated words which are obtained when all the term document data have been done with a morpheme analysis. Besides, the weight W of each word is obtained by TFIDF (Term Frequency & Inverse Document Frequency).

$$D=(W_1, W_2, \ldots, W_n) \quad (1)$$

The TFIDF is obtained as the product between the frequency of occurrences of the word in term document data (TF: Term Frequency) and the inverse number of the number of the term document data in which the word is used in all term document data (IDF: Inverse Document Frequency), by an equation (2) given below, and a larger numerical value thereof indicates that the word is more important. The TF is an index which indicates that the word occurring frequently is important, and it has the character of becoming larger with increase in the frequency at which the word occurs in certain term document data, as indicated by an equation (3) given below. The IDF is an index which indicates that the word occurring in a large number of term document data is not important, namely, that the word occurring in the specified term document data is important, and it has the character of becoming larger with decrease in the number of term document data in which the certain word is used, as indicated by equations (4)–(6) given below. Accordingly, the value of the TFIDF has the character of becoming small for any word (a conjunction, a postpositional word functioning as an auxiliary to a main word, or the like) which occurs frequently, but which occurs in the large number of term document data, or any word which occurs in only the specified term document data, but whose frequency is low even in this term document data, and conversely becoming large for any word which occurs at a high frequency in the specified term document data. The words in the term document data are turned into numerical values by the TFIDF, and the term document data can be vectorized using the numerical values as elements.

$$W(t,d)=TF(t,d) \times IDF(t) \quad (2)$$

$TF(t,d)$=Frequency of occurrence of the word t in the term document data d (3)

$$IDF(t) = \log\left(\frac{D}{DF(t)}\right) \quad (4)$$

$DF(t)$=The number of the term document data in which the word $t$ occurs in all the term document data (5)

$D$=The number of all the term document data (6)

Subsequently, the routine shifts to a step S118, at which the calculated document vector is stored in the document data registration DB 44, and it shifts to a step S120, which decides whether or not the processing of the steps S112–S118 has ended for all the term document data. Subject to the decision (Yes) that the processing has ended for all the term document data, the series of processing steps are ended to return to the original process.

On the other hand, when it is decided (No) at the step S120 that the processing of the steps S112–S118 has not ended for all the term document data, the routine shifts to a step S122, at which the next term document data is read out from the document data registration DB 44, followed by the step S114.

Meanwhile, when it is decided (No) at the step S108 that the generation of the term document data has not ended for all the document data of the document data registration DB 44, the routine shifts to a step S124, at which document data belonging to the next predetermined term is read out from the document data registration DB 44, followed by the step S104.

Further, when it is decided (No) at the step S100 that the new document data has not been created in the document data registration DB 44, the routine shifts to a step S126, which decides whether or not the document data of the document data registration DB 44 has been updated. Subject to the decision (Yes) that the document data has been updated, the routine shifts to the step S102, and subject to the other decision (No), the routine shifts to the step S100.

Next, a document data retrieval process will be described in detail with reference to FIG. 6. FIG. 6 is a flow chart showing the exemplary document data retrieval process.

The document data retrieval process is a process in which the change point of similarities is specified as to term document data which are adjacent in time series, whereupon document data belonging to the specified change point are retrieved from within the document data registration DB 44. When executed by the CPU 30, the document data retrieval process first shifts to a step S200, as shown in FIG. 6.

At the step S200, whether or not a retrieval request by a user has been inputted is decided. Subject to the decision (Yes) that the retrieval request has been inputted, the routine shifts to a step S202, but subject to the other decision (No), the routine stands by at the step S200 until the retrieval request is inputted. Incidentally, the expression retrieval request here does not signify a retrieval keyword or sentence, but it signifies requesting the computer 100 to perform retrieval.

At the step S202, the document vector of the head term document data is read out from the document data registration DB 44. The routine subsequently shifts to a step S204, at which the document vector of term document data adjacent in time series to the term document data concerning the document vector read out (temporally-new adjacent term document data) is read out from the document data registration DB 44, followed by a step S206.

At the step S206, a vector operation is executed using the two document vectors read out, thereby to calculate the similarity between the term document data concerning the two document vectors. The calculation of the similarity based on the vector operation is called the "vector retrieval technique", and this technique consists of the TFIDF which turns words into numerical values in conformity with the degrees of importance thereof, and a vector space model which computes the similarity of documents vectorized with the numerical values. By way of example, letting document vectors D1 and D2 be the two document vectors read out, the similarity can be calculated as the cosine value (0–1) of an angle defined between the document vectors D1 and D2, by an equation (7) given below.

$$\text{Cosine value of vectors (angle)} = \frac{\overline{D_1} \cdot \overline{D_2}}{|\overline{D_1}||\overline{D_2}|} \quad (7)$$

Only Calculate if neither is 0
Do not need calculate if either is 0

$$= \frac{W_{n1}W_{q1} + W_{m2}W_{q2} + \ldots + W_{mn}W_{qn}}{\sqrt{W_{n1}^2 + W_{n2}^2 + \ldots + W_{nn}^2} \sqrt{W_{q1}^2 + W_{q2}^2 + \ldots + W_{qn}^2}}$$

Subsequently, the routine shifts to a step S208, which decides whether or not the processing of the steps S204 and S206 has ended for all document vectors. Subject to the decision (Yes) that the processing has ended for all the document vectors, the routine shifts to a step S210.

Figures 7, 8:
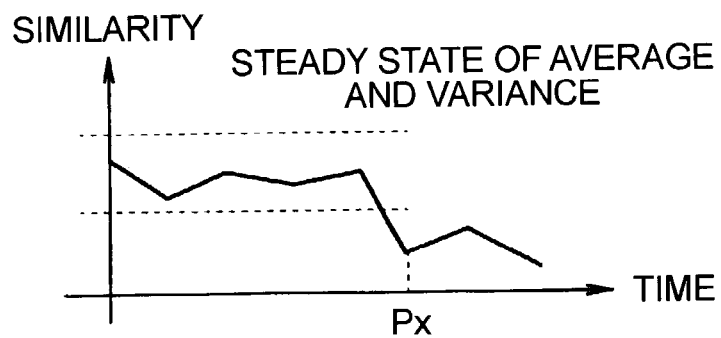
FIG. 7 is a diagram showing feature data.
FIG. 8 is a graph showing the temporal transition of similarities.

At the step S210, feature data for calculating the temporal transition of the similarities concerning the contents of the term document data is generated on the basis of similarities of the one or more term document data calculated at the step S206. In a case where the example of FIG. 3 is to be handled, the feature data is generated as the cosine values (0–1) of angles defined between the document vectors, as shown in FIG. 7. FIG. 7 is a diagram showing the feature data.

Figure 9:
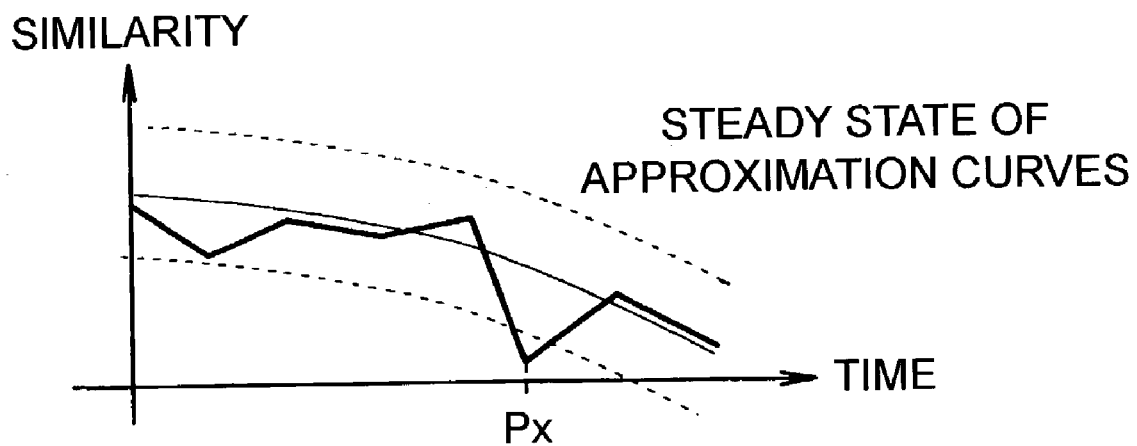
FIG. 9 is a graph showing the temporal transition of similarities.

Subsequently, the routine shifts to a step S211, at which the change point of the similarities is specified on the basis of the generated feature data. Concretely, an allowable range is set on the basis of the generated feature data, and any point exceeding the allowable range in the temporal transition of the similarities is specified as the change point. By way of example, as shown in FIG. 8, two horizontal lines serving as threshold lines are obtained from the average value and variance of the similarities, whereby a domain enclosed with the threshold lines can be set as the allowable range. In this case, the similarity of term document data Px exceeds the allowable range, and hence, it is specified as the change point. As another example, as shown in FIG. 9, two approximation curves along the transition curve of the similarity are obtained from the average value and variance of the similarities, whereby a domain enclosed with the approximation curves can be set as the allowable range. In this case, likewise to the above, the similarity of term document data Px exceeds the allowable range, and hence, it is specified as the change point. FIG. 8 and FIG. 9 are graphs each showing the temporal transition of the similarities.

Subsequently, the routine shifts to a step S212, at which document data which belong to the specified change point or the vicinity thereof are retrieved from within the document data registration DB 44. In a case where, in the example of FIG. 3, the change point of the similarities exists between October and November by way of example, it is understood that business contents have changed at the shift from October to November, and hence, the document data of the daily business-record of November may be retrieved in the sequence of younger dates.

Subsequently, the routine shifts to a step S214, at which the list of the document data is generated by rearranging the document data extracted by the retrieval, in the sequence of higher similarities, and it shifts to a step S216, at which the generated list of the document data is displayed on the display unit 42. The series of processing steps are ended to return to the original process.

Meanwhile, when it is decided (No) at the step S208 that the processing of the steps S204 and S206 has not ended for all the document vectors, the routine shifts to a step S218, at which the document vector of the next term document data is read out from the document data registration DB 44, followed by the step S204.

Next, the operation of this embodiment will be described. In a certain enterprise or the like, the progress situation of business is controlled by causing employees to submit daily business-records. Reports based on the daily business-records are checked in such a way that one supervisor looks through the daily business-records submitted by a plurality of subordinates, one by one. Each employee creates the daily business-record stating the daily business situation as document data, and he/she sends the created document data to the supervisor by attaching it to mail or email, and also registers it in the document data registration DB 44.

First, there will be described a case where document vectors are created from the document data created by the employees. Upon the creation of the document data, via the steps S100–S106, document data which belong to a predetermined term (for example, one month) since a reference date are read out from the document data registration DB 44, and term document data in which the contents of the document data read out are merged is generated, and the generated term document data is stored in the document data registration DB 44. Besides, via the repetition of the steps S102 and S104, term document data are generated and stored for all the document data of the document data registration DB 44.

Upon the generation of the term document data for all the document data, via the step S110, all the term document data are done with a morpheme analysis, and all kinds of morphemes occurring in any term document data are acquired. Subsequently, via the steps S112–S118, the head term document data is read out from the document data registration DB 44, the frequency of occurrences of each of the acquired morphemes is calculated in the term document data read out, and a vector which has elements corresponding to the calculated frequencies of occurrences, as vector quantities, is calculated as the document vector. Besides, via the repetition of the steps S114–S118, the frequencies of occurrences are calculated, and the document vectors are calculated and stored, for all the term document data.

Next, there will be described a case where the supervisor checks the document data sent from the employees. Before checking the document data, the supervisor inputs a retrieval request. Upon the input of the retrieval request, via the steps S200–S206, the document vector of the head document data is read out from the document data registration DB 44, the document vector of term document data adjacent in time series to the term document data concerning the document vector read out is read out from the document data registration DB 44, and a vector operation is executed using the two document vectors read out, thereby to calculate the similarity of the term document data concerning the document vectors. Besides, via the repetition of the steps S204 and S206, adjacent document vectors are read out, and similarities are calculated, for all document vectors.

Upon the calculation of the similarities for all the document vectors, via the steps S210 and S211, feature data which indicates the temporal transition of the similarities concerning the contents of the term document data is generated on the basis of calculated similarities of the one or more term document data, and the change point of the similarities is specified on the basis of the generated feature data. Subsequently, via the step S212, document data which belong to the specified change point or the vicinity thereof are retrieved from within the document data registration DB 44. As a result, upon the consequent extraction of the corresponding document data, via the steps S214 and S216, the document data extracted by the retrieval are rearranged in the sequence of higher similarities so as to generate the list of the document data, and the generated list of the document data is displayed on the display unit 42.

The document data displayed as retrieved results on the display unit 42 are the document data which belong to the change point of the similarities or the vicinity thereof, that is, the document data in the cases where the business contents are thought to have changed. Therefore, when the supervisor is difficult of looking through all the document data, they may preferentially check the document data extracted by the retrieval. Thus, even in a case where the amount of the daily business-records to be checked has become huge, the progress situation of the business can be efficiently controlled.

In this way, in this embodiment, the feature data for calculating the temporal transition of the similarities concerning the contents of the document data is extracted from the document data of the document data registration DB 44, the change point of the similarities is specified on the basis of the extracted feature data, and the document data are retrieved from within the document data registration DB 44 on the basis of the specified change point. Thus, the user can comparatively easily grasp featuring parts from among the huge amount of document data by referring to the document data extracted by the retrieval. Besides, since the feature data is extracted from the plurality of document data, the reliability of the extraction is enhanced more easily and the user's request can be complied with more immediately than in case of accumulating rules established by an expert.

Further, in this embodiment, the document data which belong to the specified change point or the vicinity thereof are retrieved from within the document data registration DB 44. Thus, the document data which belong to the change point or the vicinity thereof are retrieved, so that the user can more easily grasp the featuring parts from among the huge amount of document data.

Further, in this embodiment, an allowable range is set on the basis of the extracted feature data, and the point which exceeds the allowable range in the temporal transition of the similarities is specified as the change point. Thus, the change point can be uniformly specified, so that the specification of the change point becomes comparatively easy.

Further, in this embodiment, the document data of the document data registration DB 44 are partitioned at intervals of a predetermined term, the term document data in which the contents of the document data belonging to the corresponding partition are merged is generated for each partition, the similarity is calculated as to the term document data which are adjacent in time series, and the feature data is generated on the basis of the calculated similarity. Thus, when the relationship of the document data is viewed in time series, the user can grasp the featuring parts comparatively easily.

Further, in this embodiment, the term document data are done with a morpheme analysis, and a vector which has elements corresponding to the frequencies of occurrences of respective morphemes in the term document data, as vector quantities, is generated as a document vector. Thus, the similarity is calculated in correspondence with the frequencies of occurrences of the morphemes in the term document data, so that the similarity can be calculated in a form which comparatively conforms to actual circumstances, and the user can more easily grasp the featuring parts from among the huge amount of document data.

Further, in this embodiment, in the computation of the angle of the document vectors, only parts at which the weight W between the same dimensions is not "0" are computed as indicated by the above equation (7). Thus, any wasteful computation can be omitted.

Figure 10:
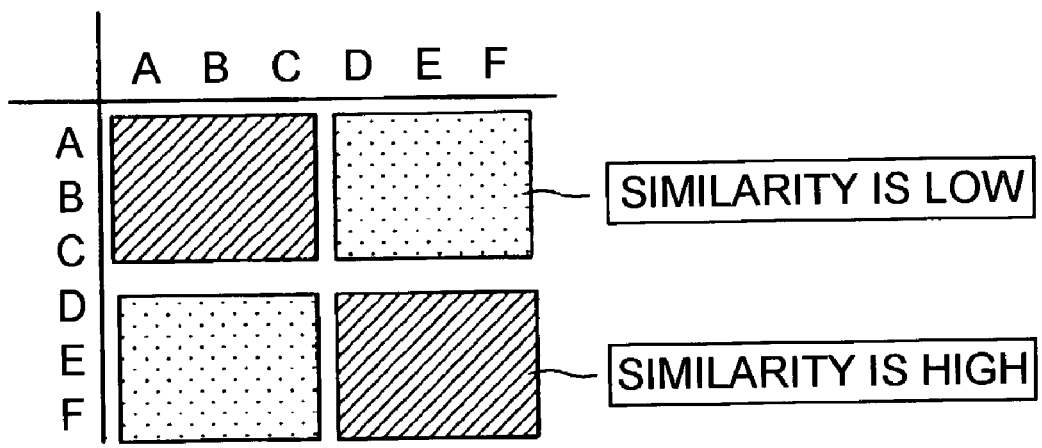
FIG. 10 is a diagram for explaining a case where document data are retrieved by a two-dimensional analysis.

Incidentally, the above embodiment is constructed so that the document data of the document data registration DB 44 are partitioned at intervals of a predetermined term, that the term document data in which the contents of the document data belonging to the corresponding partition are merged is generated for each partition, that the similarity is calculated as to the term document data which are adjacent in time series, and that the feature data is generated on the basis of the calculated similarity. However, the present invention is not restricted to the embodiment, but it may well be constructed as shown in FIG. 10 so that the document data of the document data registration DB 44 are partitioned at intervals of a predetermined term, that the term document data in which the contents of the document data belonging to the corresponding partition are merged is generated for each partition, that the similarities are calculated among the generated term document data one another, and that the feature data is generated on the basis of the calculated similarities. FIG. 10 is a diagram for explaining a case where the document data are retrieved by a two-dimensional analysis.

In the case where the comparison is made between only the adjacent terms as in the above embodiment, a gradual change may possibly be contained in a steady state. When the two-dimensional analysis as shown in FIG. 10 is made though somewhat costly as an analytical method, even the gradual change can be detected. Of course, the two-dimensional analysis is not restrictive, but the idea can be extended to make an analysis of three or more dimensions. Thus, when the relationship of the document data is viewed among the intervals of the predetermined term one another, the user can grasp the featuring parts comparatively easily.

Besides, the above embodiment is constructed so that the document data of the document data registration DB 44 are partitioned at intervals of a predetermined term, that the term document data in which the contents of the document data belonging to the corresponding partition are merged is generated for each partition, and that the similarities are generated on the basis of the generated term document data. However, the present invention is not restricted to the embodiment, but it may well be constructed so that contents common to the respective term document data are removed from these term document data, and that the similarities are calculated on the basis of the term document data subjected to the removal. Thus, the similarities are calculated after the removal of the common contents, so that the similarities can be calculated in a form which comparatively conforms to actual circumstances, and the user can more easily grasp the featuring parts from among the huge amount of document data.

Figure 11:
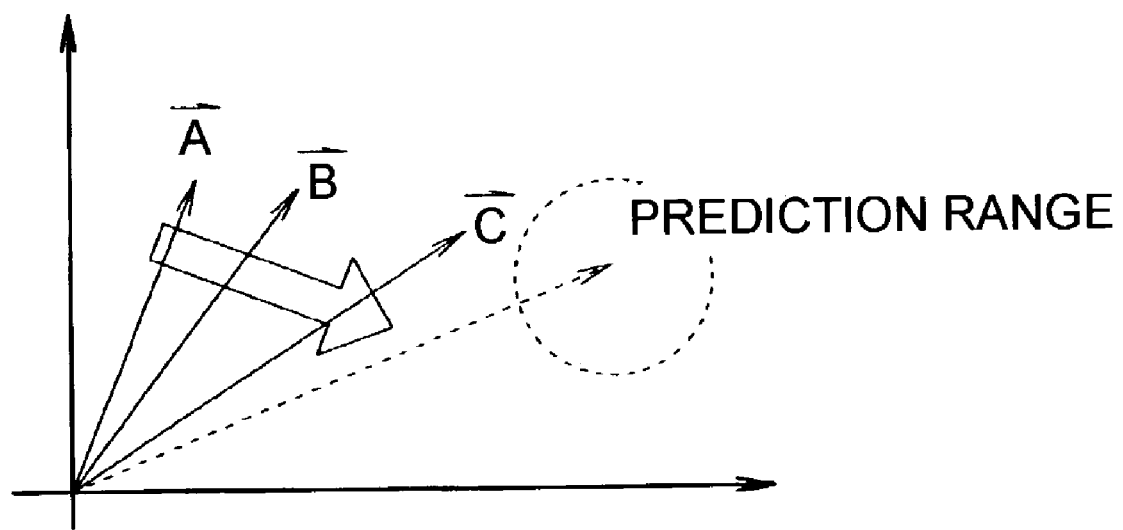
FIG. 11 is a diagram for explaining a case where a change point is specified by the prediction of the loci of document vectors.

Besides, the above embodiment is constructed so that an allowable range is set on the basis of the extracted feature data, and that the point which exceeds the allowable range in the temporal transition of the similarities is specified as the change point. However, it should be understood that the present invention is not restricted to the embodiment, but it may well be constructed as shown in FIG. 11 so that loci in a multi-dimensional vector space are predicted as to the document vectors of the respective term document data, thereby to set a prediction range, and that the document vector which exceeds the prediction range is specified as a change point. FIG. 11 is a diagram for explaining the case where the change point is specified by the prediction of the loci of the document vectors.

Besides, in the above embodiment, it has been described that the control programs stored in the ROM 32 beforehand are run in both the cases of executing the processes shown in the flow charts of FIG. 2 and FIG. 6. However, the present invention is not restricted to the embodiment, but the programs indicating the steps of the processes may well be run after being loaded into the RAM 34 from a storage medium storing these programs.

Here, the storage medium can cover any storage medium which is readable by a computer irrespective of a reading method such as an electronic, magnetic, or optical method, and which includes a semiconductor storage medium such as RAM or ROM, a magnetic memory type storage medium such as FD or HD, an optical reading scheme storage medium such as CD, CDV, LD, or DVD, or a magnetic memory type/optical reading scheme storage medium such as MO.

Besides, in the above embodiment, the data management device, document data retrieval device, data management program, document data retrieval program, data management method, and document data retrieval method according to the present invention have been applied to the case where, as shown in FIG. 1, the featuring document data is retrieved from among the plurality of document data by the computer 100. However, it should be understood that the present invention is not restricted to the embodiment, but it is also applicable to other cases within a scope not departing from the purport thereof. By way of example, the present invention can also be applied as a retrieval service in which featuring document data is retrieved from among a plurality of document data in the Internet or any other network.

As described above, in accordance with a data management device according to the present invention, there is obtained the advantage that a user can comparatively easily grasp featuring parts from among a huge amount of data by referring to a specified change point. Besides, since feature data is extracted from among a plurality of data, there is obtained the advantage that the reliability of extraction is enhanced more easily and that a user's request can be complied with more immediately, than in case of accumulating rules established by an expert.

Further, in accordance with a data management device according to the present invention, there is obtained the advantage that a user can comparatively easily grasp featuring parts from among a huge amount of document data by referring to a specified change point.

Meanwhile, in accordance with a document data retrieval device according to the present invention, there is obtained the advantage that a user can comparatively easily grasp featuring parts from among a huge amount of document data by referring to document data extracted by retrieval. Besides, since feature data is extracted from among a plurality of document data, there is obtained the advantage that the reliability of extraction is enhanced more easily and that a user's request can be complied with more immediately, than in case of accumulating rules established by an expert.

Further, in accordance with a document data retrieval device according to the present invention, document data which belong to a change point or the vicinity thereof are retrieved, and hence, there is obtained the advantage that a user can more easily grasp featuring parts from among a huge amount of document data.

Further, in accordance with a document data retrieval device according to the present invention, the change point can be uniformly specified, and hence, there is obtained the advantage that the specification of the change point becomes comparatively easy.

Further, in accordance with a document data retrieval device according to the present invention, there is obtained the advantage that, when the relationship of document data is viewed in time series, a user can grasp featuring parts comparatively easily.

Further, in accordance with a document data retrieval device according to the present invention, there is obtained the advantage that, when the relationship of the document data is viewed among these document data every predetermined term one another, a user can grasp featuring parts comparatively easily.

Further, in accordance with a document data retrieval device according to the present invention, similarities are calculated in correspondence with the frequencies of occurrences of morphemes in term document data, and hence, there is obtained the advantage that the similarities can be calculated in a form which comparatively conforms to actual circumstances, and that a user can more easily grasp featuring parts from among a huge amount of document data.

Further, in accordance with a document data retrieval device according to the present invention, similarities are calculated after common contents have been removed, and hence, there is obtained the advantage that the similarities can be calculated in a form which comparatively conforms to actual circumstances, and that a user can more easily grasp featuring parts from among a huge amount of document data.

Meanwhile, in accordance with a data management program according to the present invention, advantages equivalent to those of the data management device as defined above are obtained.

Further, in accordance with a data management program according to the present invention, an advantage equivalent to that of the data management device as defined above is obtained.

Meanwhile, in accordance with a document data retrieval program according to the present invention, advantages equivalent to those of the data management device as defined above are obtained.

Meanwhile, in accordance with a data management method according to the present invention, advantages equivalent to those of the data management device as defined above are obtained.

Further, in accordance with a data management method according to the present invention, an advantage equivalent to that of the data management device as defined above is obtained.

Meanwhile, in accordance with a document data retrieval method according to the present invention, advantages equivalent to those of the data management device as defined above are obtained.

What is claimed is:

1. A device for performing retrieval from among a plurality of document data of different creation dates or updates having a document data retrieval device, comprising:
   a document data storage device for storing the plurality of document data;
   a feature data extraction device that extracts feature data for calculating a temporal transition of similarities concerning contents of the document data from among the document data of said document data storage device;

a change point specified device that specifies a change point of the similarities on the basis of the feature data extracted by said feature data extraction device; and a document data retrieval device that retrieves the document data from within said document data storage device on the basis of the change point specified by said change point specified device.

2. The document data retrieval device according to claim 1, said document data retrieval device retrieving the document data from within said document data storage device on the basis of a specified vicinity to the change point specified by said change point specified device.

3. The document data retrieval device according to claim 1, said change point specified device setting an allowable range on the basis of the feature data extracted by said feature data extraction device and specifies a point which exceeds the allowable range in the temporal transition of the similarities, as the change point.

4. The document data retrieval device according to claim 1, said feature data extraction device partitioning the document data of said document data storage device at intervals of a predetermined term, generating term document data for each partition in which contents of the document data belonging to the corresponding partition are merged, calculating the similarity as to the term document data which are adjacent in time series, and generating the feature data on the basis of the calculated similarity.

5. The document data retrieval device according to claim 4, said feature data extraction device calculating document vectors which indicate features of contents of the term document data, and comparing the calculated document vectors to calculate the similarities.

6. The document data retrieval device according to claim 5, said feature data extraction device conducting a morpheme analysis of the term document data, and generating a vector, as the document vector, which has an element, as a vector quantity, corresponding to frequencies of occurrences of respective morphemes in the term document data.

7. The document data retrieval device according to claim 4, said feature data extraction device removing contents common to the respective term document data from these respective term document data, and calculating the similarities on the basis of the term document data subjected to the removal.

8. The document data retrieval device according to claim 1, said feature data extraction device partitioning the document data of said document data storage device at intervals of a predetermined term, generating term document data for each partition in which contents of the document data belonging to the corresponding partition are merged calculating the similarities among the generated term document data to one another, and generating the feature data on the basis of the calculated similarities.

9. A computer-readable medium on which is recorded a document retrieval program for performing retrieval from among a plurality of document data of different creation dates or update dates, the document data retrieval program causing a computer to execute a process, the process comprising:

accessing a document data storage device that stores a plurality of document data;

extracting feature data for calculating a temporal transition of similarities concerning contents of document data from among the plurality of document data stored in the document data storage device;

specifyng a change point of the similarities on the basis of the extracted feature data; and retrieving document data from within the document data storage device on the basis of the specified change point.

10. A document data retrieval method for performing retrieval from among a plurality of document data of different creation dates or update dates, the method comprising:

storing a plurality of document data in a document data storage device;

extracting feature data for calculating a temporal transition of similarities concerning contents of the document data, from among the document data stored in the document data storage device;

specifying a change point of the similarities on the basis of the extracted feature data; and retrieving the document data from the document data storage device on the basis of the specified change point.

* * * * *